United States Patent
Roddy

(10) Patent No.: US 7,574,500 B2
(45) Date of Patent: Aug. 11, 2009

(54) ESTABLISHING A CACHE EXPIRATION TIME TO BE ASSOCIATED WITH NEWLY GENERATED OUTPUT BY DETERMINING MODULE- SPECIFIC CACHE EXPIRATION TIMES FOR A PLURALITY OF PROCESSING MODULES

(75) Inventor: Brian Roddy, San Francisco, CA (US)

(73) Assignee: Reactivity, Inc., Belmont, CA (US)

( * ) Notice: Subject to any disclaimer, the term of this patent is extended or adjusted under 35 U.S.C. 154(b) by 448 days.

(21) Appl. No.: 11/355,193

(22) Filed: Feb. 14, 2006

(65) Prior Publication Data

US 2006/0184656 A1   Aug. 17, 2006

Related U.S. Application Data

(60) Provisional application No. 60/653,064, filed on Feb. 14, 2005.

(51) Int. Cl.
*G06F 15/173* (2006.01)
(52) U.S. Cl. .................. 709/223; 709/216; 711/123; 711/126; 711/135; 707/5
(58) Field of Classification Search .......... 709/203, 709/217, 219, 235, 246, 216, 223, 207; 707/5; 711/118–119, 123, 125, 126, 133, 135
See application file for complete search history.

(56) References Cited

U.S. PATENT DOCUMENTS

| | | | |
|---|---|---|---|
| 5,896,506 A * | 4/1999 | Ali et al. ................. 709/213 |
| 6,772,203 B1 * | 8/2004 | Feiertag et al. .......... 709/219 |
| 6,792,507 B2 * | 9/2004 | Chiou et al. .............. 711/119 |
| 7,275,131 B2 * | 9/2007 | Goodman .................. 711/106 |
| 7,363,429 B2 * | 4/2008 | Wu et al. .................. 711/133 |
| 2002/0078299 A1 * | 6/2002 | Chiou et al. .............. 711/119 |
| 2002/0103934 A1 * | 8/2002 | Fishman et al. .......... 709/246 |
| 2002/0143892 A1 * | 10/2002 | Mogul .................... 709/217 |
| 2003/0217169 A1 * | 11/2003 | James et al. ............. 709/231 |
| 2004/0034744 A1 * | 2/2004 | Karlsson et al. .......... 711/133 |
| 2004/0054779 A1 * | 3/2004 | Takeshima et al. ....... 709/225 |
| 2004/0068579 A1 * | 4/2004 | Marmigere et al. ...... 709/242 |
| 2004/0128346 A1 * | 7/2004 | Melamed et al. ......... 709/203 |
| 2005/0010727 A1 * | 1/2005 | Cuomo et al. ............ 711/138 |
| 2005/0027798 A1 * | 2/2005 | Chiou et al. ............. 709/203 |
| 2005/0039054 A1 * | 2/2005 | Satoh et al. ............. 713/201 |
| 2005/0117558 A1 * | 6/2005 | Angermann et al. ..... 370/338 |
| 2005/0120180 A1 * | 6/2005 | Schornbach et al. ..... 711/133 |
| 2005/0172078 A1 * | 8/2005 | Wu et al. ................ 711/133 |
| 2005/0198326 A1 * | 9/2005 | Schlimmer et al. ...... 709/229 |
| 2006/0080546 A1 * | 4/2006 | Brannon et al. .......... 713/185 |
| 2006/0136669 A1 * | 6/2006 | Goodman ................ 711/118 |
| 2006/0167969 A1 * | 7/2006 | Andreev et al. .......... 709/202 |

OTHER PUBLICATIONS

Mogul c., "Squeezing More Bits Out of HTTP Caches", IEEE Network, May/Jun. 2000.*

* cited by examiner

*Primary Examiner*—Oanh Duong
(74) *Attorney, Agent, or Firm*—Baker Botts L.L.P.

(57) ABSTRACT

Providing an input-dependent output is disclosed. A received message is processed to determine if a previously cached output exists for the received message. If a previously cached output is found, the previously cached output is provided to a destination other than the sender of the received message as output for the received message.

27 Claims, 3 Drawing Sheets

```
<SOAP: ENV>
    <SOAP: HEADER>
        <SAML>
            <AUTH>            ...       </AUTH>
            <XML SIGNATURE>   ...  </XML SIGNATURE>
        </SAML>
    </SOAP: HEADER>
    <SOAP: BODY>

XML...

</SOAP: BODY>
</SOAP: ENV>
```

ESTABLISHING A CACHE EXPIRATION TIME TO BE ASSOCIATED WITH NEWLY GENERATED OUTPUT BY DETERMINING MODULE- SPECIFIC CACHE EXPIRATION TIMES FOR A PLURALITY OF PROCESSING MODULES

CROSS REFERENCE TO OTHER APPLICATIONS

This application claims priority to U.S. Provisional Patent Application No. 60/653,064 entitled PROXY SERVER CACHING filed Feb. 14, 2005 which is incorporated herein by reference for all purposes.

BACKGROUND OF THE INVENTION

In a proxy server or gateway, large amounts of analysis and processing may be required to be performed on received data and one or more input-determined outputs generated and sent, e.g., to a backend server or other system, for further processing. Functions such as XML verification, XML validation, encryption/decryption, signature verification, credential verification, identity verification, credential mapping, time stamp verification, content based routing, XML transformations, and data format mapping can be performed on the incoming data by the proxy server or gateway. In such devices, it typically is important to process incoming transactions as quickly as possible. In some network traffic patterns, the same network data may be received by the proxy server more than once. This can create inefficient analysis and processing by the proxy server, for example if the same processing is performed repeatedly on the same input data to determine the same result or output. For example, in a web services or other environment multiple requests to/from multiple servers may be required to complete a single transaction. In some configurations, each such request may include the same security token or credential, e.g., a security assertions markup language (SAML) token associated with the transaction. In a typical prior art proxy server or gateway, each credential received by the proxy server may have to be verified through a computationally expensive verification process, e.g., computing an XML or other signature, even though the same credential has been verified using the same signature in an earlier request associated with the transaction. Therefore, there exists a need to more efficiently handle analysis and processing of like inputs in a proxy server or gateway.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. For example, the invention can comprise a computer program product for providing an input-dependant output, the computer program product being embodied in a computer readable medium and comprising computer instructions for performing the operations described below. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Caching input-dependent proxy server outputs is disclosed. In an embodiment, a received message is checked before full analysis and processing to determine if the message or part of the message has been seen before. If the message has been seen before and a cached output message from the previously seen message is available, the cached output is provided as output without actually repeating the processing of the received message. Otherwise, the received message is processed and the result is cached if appropriate.

Figure 1:
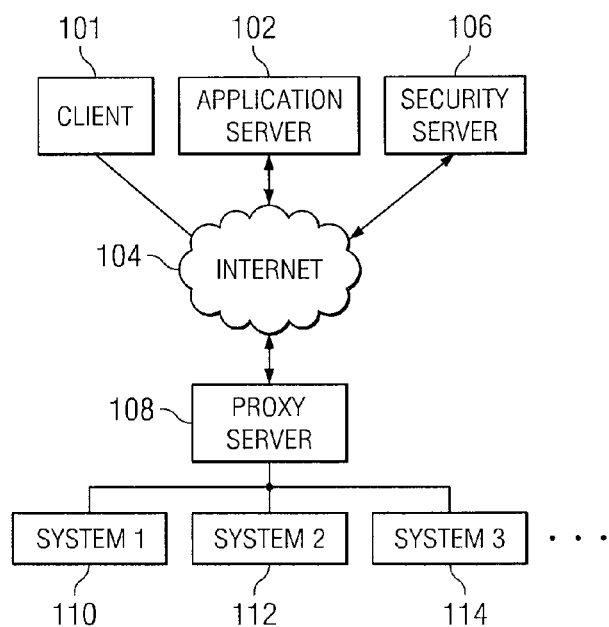
FIG. 1 illustrates an embodiment of a network environment.

FIG. 1 illustrates an embodiment of a network environment. In this example, client 101 and application server 102 are connected by the internet 104 to security server 106 and proxy server 108 and systems 1-3 (110-114) behind the proxy server 108. There may be any number of systems behind the proxy server, which depending on the configuration may be implemented in or on and/or associated with a gateway and/or firewall. The systems maybe additionally connected to each other through any public or private network and/or combination thereof, including without limitation an intranet, LAN, WAN, and other forms of connecting multiple systems and or groups of systems together. In an embodiment, application server 102 includes any application system requiring communication with any number of the systems behind the proxy server 108. In an embodiment, application server 102 is web application server configured to receive and process requests or transactions initiated by a network-connected client such as client 101. In an embodiment, security server 106 is a Security Assertion Markup Language (SAML) server. In an embodiment, proxy server 108 is an XML gateway server, such as the Reactivity Gateway™ available from Reactivity, Inc. of Belmont, Calif. In an embodiment, systems 1-3 (110-114) are web servers. In other embodiments, systems 1-3 (110-114) are any network nodes communicating with an application server. While in the example shown in FIG. 1 systems 1-3 (110-114) are part of the same internal network, in other embodiments one or more of systems 1-3 may be part of a different network and/or may be configured to communicate with proxy server 108, e.g., for XML schema validation or other processing, via the Internet 104 or some other public or private network.

In one embodiment, when application server 102 wants to communicate with system 1 (110), it obtains an authorization and a signature verifying the authorization, e.g., a SAML token, from security server 106. The given authorization and signature is inserted into the message to be sent to system 1 (110), for example. When the message is sent to system 1 (110), the message is first received and processed by proxy server 108. In an embodiment, the processing performed by proxy server 108 includes one or more of message processing for security, integrity, correctness, and efficient message management and routing. In an embodiment, the processing includes verifying the authorization by verifying the associated signature. If the message authorization and signature is valid, the message is sent to system 1 (110) as intended. Additionally system 1 (110) may route the same message, or a related message containing same security token, e.g., to other systems through the proxy server 108. Since the proxy server 108 must receive and process, including by verifying the security information, all messages sent and received by the systems associated with the proxy server, the proxy server can hinder performance if the proxy server processes messages inefficiently, such as by repeatedly reprocessing the same input data to generate the same result or output. For example, if the same SAML or other security token were present in multiple messages, an inefficient proxy server would be configured, as typical prior art proxy servers are, to process the input data (e.g., security token) each time it is received. Caching input-determined proxy server results, e.g., proxy server output messages, is disclosed. In some embodiments, if a message to be processed by the proxy server is either entirely or partially the same as a previously processed message, the result of the processing of the previously processed message is used, if appropriate, as the result for the current message, thereby avoiding the need to process the same input data a second (or third, etc.) time to generate the same corresponding output. In some embodiments, if a previously-cached result is not available for a received message (or portion thereof, depending on the embodiment), the message (or portion) is process normally and the result cached, if appropriate. In some embodiments, results that depend in part on variable data, such that it is not necessarily or will not generally be the case that the exact same output or result will be generated for the same input (e.g., because the result depends at least in part on time, random data, or some other variable data in addition to the received input data) are not cached while results that will be exactly the same for the exact same corresponding input data are cached. In some embodiments, results or portions thereof are cached for a prescribed amount of time. In some embodiments, different results or types of result may be cached for different periods of time. In some embodiments, the caching period may be preconfigured and/or user configurable.

Figure 2:
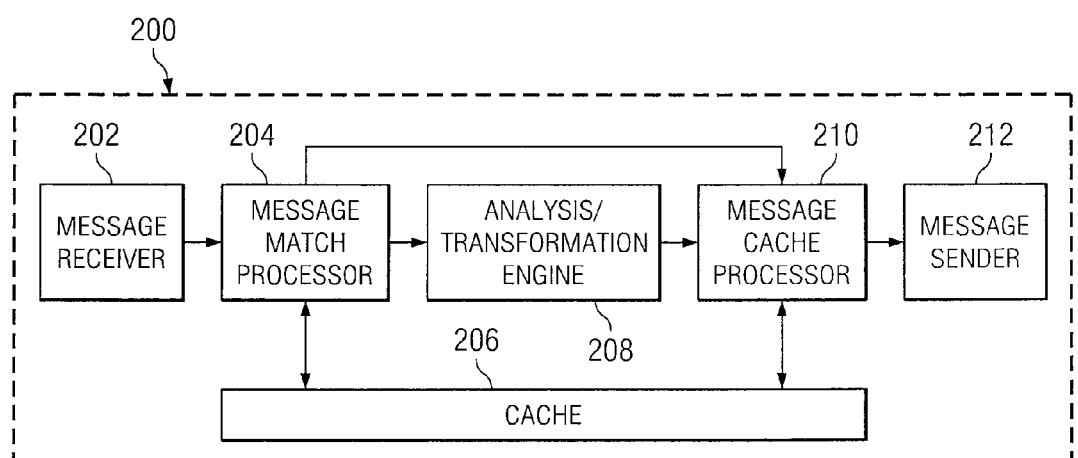
FIG. 2 illustrates an embodiment of a proxy server.

FIG. 2 illustrates an embodiment of a proxy server. In the example shown, proxy server 200 includes a message receiver 202, a message match processor 204, a cache 206, an analysis/transformation engine 208, a message cache processor 210, and a message sender 212. The message is received for processing at message receiver 202. In some embodiments, message receiver 202 and message sender 212 include a network communication interface such as a network interface card or chipset. Message match processor 204 determines if the currently received message has been processed before and the corresponding result and/or output cached in cache 206. Cache 206 can be organized in any format and implemented in any way, e.g., in memory included in and/or otherwise associated with proxy server 200. The cache may include data other than the results and/or output associated with previously processed messages, including data fetched from the internet and any other data requiring caching. In another embodiment, the caches for various functions are logically separate. In an embodiment, cache 206 can be indexed by a message identifier. The message identifier can be a message digest or any another way of identifying equivalent messages. In an embodiment, the entire message is compared to a cache entry using a digest, e.g., a hash, of the entire message. In another embodiment, a portion of the message is compared to a cache entry using a message digest of the portion of the message. In an embodiment, the message is in XML format. In an embodiment, a subtree of the XML message is compared to a cache entry using a message digest associated with the subtree. In an embodiment, a message identifier already existing inside the message is used to compare the message to a cache entry. If the complete message matched a currently valid entry in the cache, the cached processed message is retrieved by the message cache processor 210 and passed to the message sender 212 to be sent to the destination. In some embodiments, if there are no matches or only message sub portion matches, analysis/transformation engine 208 processes the message, skipping any portions for which a currently valid result has previously been computed and stored in the cache. In some embodiments, if a currently valid previously-cached result is found in the cache by message match processor 204, the analysis/transformation engine 208 is bypassed and the message cache processor 210 retrieves the associated cached result from cache 206 and provides it to message sender 212 to be sent to the appropriate destination. In some embodiments, message match processor 204 retrieves the previously cached result from cache 206 and provides the result directly to message sender 212. In some embodiments, there is a link, not shown in FIG. 2, between the analysis/transformation engine 208 and the cache 206 to transfer any necessary cache data between the engine 208 and the cache 206. In some embodiments, analysis/transformation engine performs one or more of the following: XML verification, XML validation, encryption/decryption, signature verification, credential verification, identity verification, credential mapping, time stamp verification, content based routing, XML transformations, and data format mapping. In some embodiments, for messages and/or portions thereof for which the analysis/transformation engine 208 provides a new or updated result, message cache processor 210 caches the processed message and/or portion thereof and the associated result/output data into cache 206. In an embodiment, only a portion of the processed messaged is cached, e.g., only the portion(s) for which a policy or other configuration data indicates a result should be cached. In an embodiment, the associated data includes a message identifier and an expiration time of the cache entry. In some embodiments, a different expiration time may apply to different portions of a cached result. In some embodiments, the analysis/transformation engine 208 includes one or more modules and each is configured to append to the processed message and/or result an expiration time associated with that module if the expiration time associated with the current module is shorter than the expiration time associated with the message either by prior modules or default. A cached output (or portion thereof) for which the associated expiration time has passed is not considered currently valid. The processed message is sent by message sender 212.

The extensible markup language ("XML") is a tool currently used widely to represent and exchange data. XML is a meta-language that allows one to define how data will be represented in a manner understandable to others across platforms, applications, and communications protocols. The current version of XML, XML 1.0 ($2^{nd}$ Ed.), is specified by the World Wide Web Consortium (W3C) in the W3C Recommendation entitled "Extensible Markup Language (XML) 1.0, Second Ed.", dated Aug. 14, 2000, available at http://www.w3.org/TR/REC-xml, which specification is incorporated herein by reference for all purposes.

XML may be used to exchange data for many useful purposes. One growing area of use is the web services sector. The term "web services" refers generally to the idea of using a first computer, e.g., an application server, to perform computations or other processing tasks for one or more other computers that have access to the first computer via a network, such as the World Wide Web. For example, a client computer may be configured to invoke an application or other process running on a server computer with which the client is configured to communicate via a network by sending to the server a "remote procedure call" identifying, e.g., the processing to be performed and providing the input data, if any, required to perform the operation. Depending on the nature of the application or process running on the server and/or the remote procedure call (RPC), the server may be configured to return to the client (or some other destination) some result of the processing or computation performed by the server. For example, a web-based airline reservation service may contract with a third party to process credit card transactions based on reservation, credit card, and price information passed to the third party's server by one of the airline reservation service's systems.

To facilitate the use of web services and similar technologies, the W3C has developed the Simple Object Access Protocol (SOAP), as described in the SOAP Version 1.2 specification, dated Jun. 24, 2003, a copy of which is available on the web at http://www.w3.org/TR/soap12, which is incorporated herein by reference for all purposes. SOAP defines a lightweight communications protocol for sending requests to remote systems, e.g., an RPC to a remote web services platform. SOAP requests and responses are encapsulated in a SOAP "envelope". The envelope includes a header portion that includes information about the request and how it should be handled and processed and a body portion that includes the request itself and associated data. SOAP requests and responses may be sent using any suitable transport protocol or mechanism, e.g., HTTP. In many cases, the request and associated data included in the body portion of a SOAP request take the form of an XML document (or other infoset), due to the platform and application independent nature of XML as described above.

Figures 3, 4A:
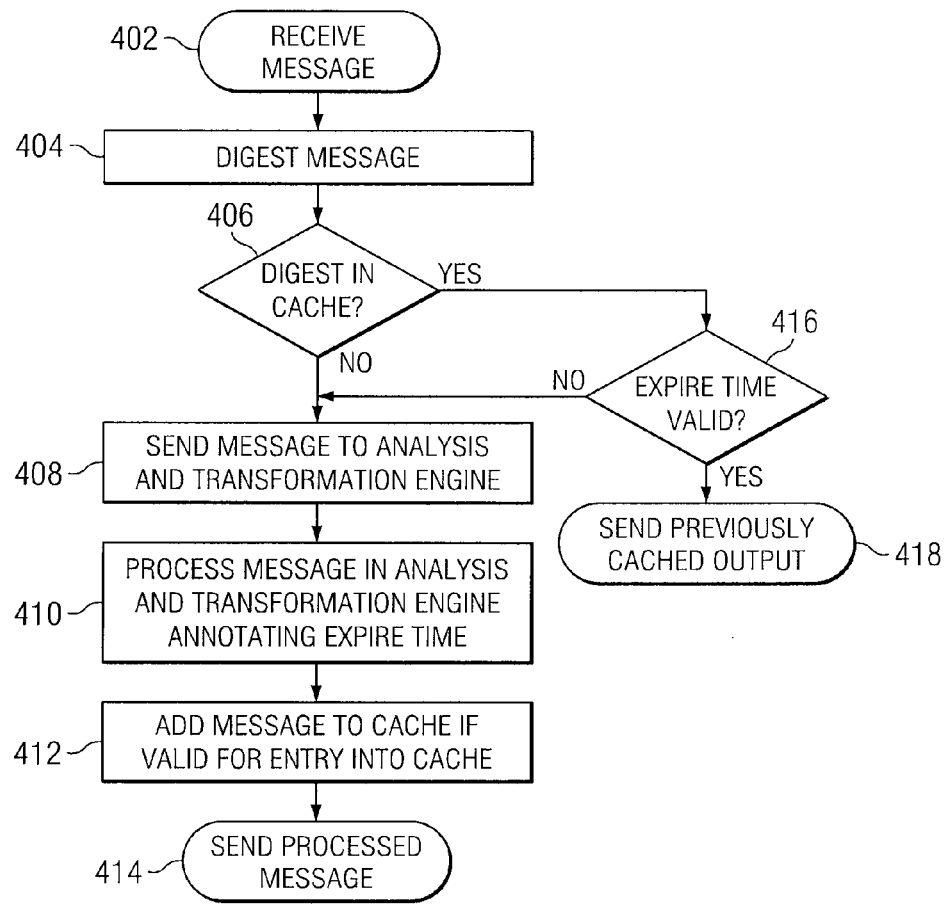
FIG. 3 is an embodiment of an example SOAP message.
FIG. 4A illustrates an embodiment of a process for sending a processed message.

FIG. 3 is an embodiment of an example SOAP message. The <SOAP:ENV> or "envelope" tag encloses the XML message. In the example shown, inside a header portion, identified by the <SOAP:HEADER> tag, a <SAML> tag exists. The <SAML> portion of the message includes security related sub-tags <AUTH> and <XML SIGNATURE>. Inside <AUTH> is data related to authorization of the message given by a SAML server such as the security server 106 of FIG. 1. Inside <XML SIGNATURE> is data related to a signature given and/or computed based at least in part on data provided by the SAML server verifying the data inside the <AUTH> tag. The contents of the body portion of the message, indicated by the <SOAP:BODY> tag, are various other data elements each identified by an associated XML tag. Any type of tags and data can exist in the message. The simplified example shown in FIG. 3 is purely illustrative. The proxy server is configured in some embodiments to cache entire messages or sub-sections thereof. For example, the entire message of FIG. 3 can be used to produce a digest to identify and match entries inside a cache holding entire processed messages. In another embodiment, only a relevant sub-section is used to produce a digest to identify and match entries inside a cache holding processed data related to the sub-section of the message. Validating the signature of a SAML authorization is a computationally expensive task that is often required to be executed multiple times within a group of messages sent with same authorization data (e.g., the same SAML token), e.g., as part of a related set of web services messages. Referring to the example shown of FIG. 3, in some embodiments only the SAML authentication and signature portions are subjected to caching. In another embodiment, only the data inside the <SOAP:BODY> tag is used in message caching. In another embodiment, a portion of time dependent XML data is not used in message caching due to their non-static property. In some embodiments, if time dependent data is present in any portion of the message, or if the output generated for any portion of the message is not static (i.e., the same each time the processing is performed for the same input), no part of the message and/or associated output is cached. In some embodiments, a time dependent or otherwise variable portion of a received message, e.g., a timestamp or time-to-live, may be ignored and remaining portions used to determine if a previously processed result or output associated with the received message has been cached. In some embodiments, a policy may be established to permit results or output to be cached and used for a prescribed period even if the result or output is or may not in every case be static (i.e., the same result or output for the same input), such as the result of a callout to an SSO or LDAP server.

Analyzing and caching proxy server results is performed in some embodiments at the application layer of the network protocol stack. For example, in some embodiments received messages are decoded at least in part to the application layer level, e.g., making HTTP or other application layer content available for processing/analysis, making it possible for the proxy server to determine that the same application layer content was received and processed previously.

In some embodiments, a connection is terminated at the proxy server by the sender of the data received at the proxy server and the result or output is sent to a further destination via a communication originating from the proxy server to the further destination. In some embodiments, the sender from which the data received and processed by the proxy server and the further destination may be different. In some embodiments, the proxy server performs services for the further destination, such as security processing, XML validation, etc.

In an embodiment, XML messages are validated. One way to validate an XML document, for example, is to verify that the document conforms to the structure and content rules prescribed for the document. Under the XML specification, a document type definition (DTD) or schema may be used to define the structure and content of XML documents of the type defined by a particular DTD or schema. A DTD may be used, e.g., to define the data elements that may occur in an XML document governed by the DTD, the attributes associated with each element, the type (e.g., format or nature) of data values that may be associated with each element and/or attribute, and the relationship of elements to each other (e.g., which elements are sub-elements of which other elements, how many times may an element occur, must elements occur in a particular order, etc.).

The XML schema definition language provides additional tools that can be used to define a class of XML documents. The XML schema language is described and defined in the following W3C documents: XML Schema Requirements, dated Feb. 15, 1999, available at www.w3.org/TR/NOTE-xml-schema-req; XML Schema Part 1: Structures, dated May 2, 2001, available at www.w3.org/TR/xml-schema-1; and XML Schema Part 2: Data Types, dated May 2, 2001, available at www.w3.org/TR/xmlschema-2. Like a DTD, an XML schema is used to define data types and prescribe the grammar for declaring elements and attributes. The XML schema language provides an inventory of XML markup constructs that may be used to create a schema that defines and describes a class of XML documents. Syntactic, structural, and value constraints may be specified.

FIG. 4A illustrates an embodiment of a process for sending a processed message. This process may be implemented on a proxy server. In the example shown, the process begins at 402, and the message is received. At 404, the message is digested to produce a message digest used to identify a message. The entire message or a portion of the message can be digested. The digest can be produced using any technique including MD5 and any other hashing function. In an embodiment, the portion of the message to be used for the digest can be preconfigured or dynamically configured. At 406, the produced digest is checked in the cache for a match. If a match does not exist, the message is sent to the analysis and transformation engine at 408. At 410, the message is processed by various modules in the analysis and transformation engine that each process and annotate, if appropriate, an expiration time of the processed message for the cache. The various modules of analysis and transformation engine include modules associated with one or more of the following: XML verification, XML validation, encryption/decryption, signature verification, credential verification, identity verification, credential mapping, time stamp verification, content based routing, XML transformations, and data format mapping. In an embodiment, the expiration time indicates a time at which the processed message is no longer valid in the cache if the message had been placed in the cache. For example, an entry with an authorization credential lasting ten seconds will be annotated with an expiration time of ten seconds. A message that should not be placed in the cache is annotated with an expiration time of zero. The expiration time can be absolute or relative. At 412, the message is added to the cache if the processed message is valid for entry into the cache. In an embodiment, the processed message is added to a cache indexed by the message digest and the expiration time. The processed message is sent at 414. At 406 if the digest match had been found, the expiration time of the matched cache entry is checked at 416. If the expiration time had expired, the process continues to 408. If the expiration time had not expired, the previously cached output is sent at 418.

Figure 4B:
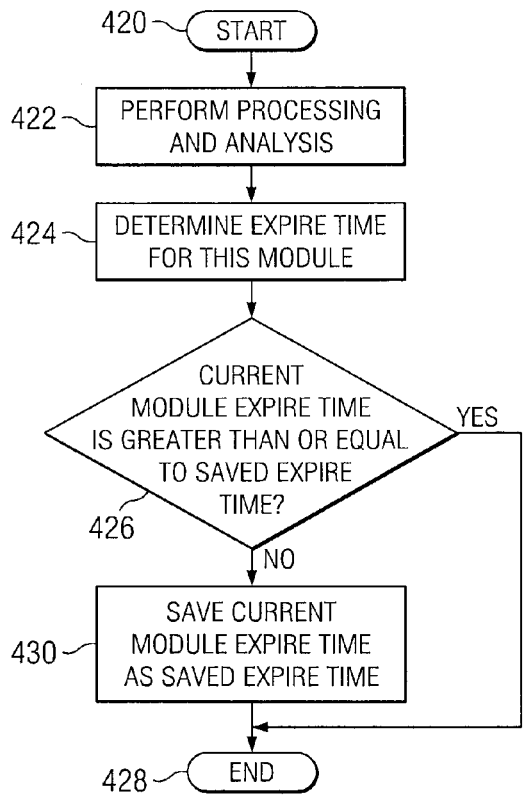
FIG. 4B illustrates an embodiment of a process for processing and annotating a processed message with a cache expiration time, if appropriate.

FIG. 4B illustrates an embodiment of a process for processing and annotating a processed message with a cache expiration time, if appropriate. The process of FIG. 4B is used in one embodiment to implement 410 of FIG. 4A. The process starts at 420. At 422, processing and analysis is performed on a message by a module. At 424, an expiration time to annotate the processed message is determined. This determination could be arrived using computation and/or preconfigured data. If the expiration time is determined at 426 to be greater than a previously saved or annotated expiration time annotated by another module, the saved expiration time of the processed message is not changed, and the process ends at 428. This allows the expiration time be the shortest of all expiration times individually determined by each successively processing module. For example, an authorization verification module might determine an expiration time of a message to be ten seconds corresponding to an authorization expiration time. However if an earlier decryption module determined that the message should not be cached due to a random decryption algorithm required to decrypt the message, the previously saved expiration time of zero is not changed by the authorization verification module. A message may be marked to be not cached because the contents of the message are dynamic. In a Callout SSO/LDAP module, data is fetched from a remote server. Since the fetched data may be different even if the input data used to fetch the data is the same, the message may be marked to be not cached. If the current module expiration time for the message is determined at 426 to be less than the saved expiration time, at 430 the current module expiration time is annotated as the saved expiration time of the message. The process ends at 428, and the message may be passed again to another module. In an embodiment, an expiration time is not used. In another embodiment, another marker is used to indicate if the message should be not cached.

Figure 4C:
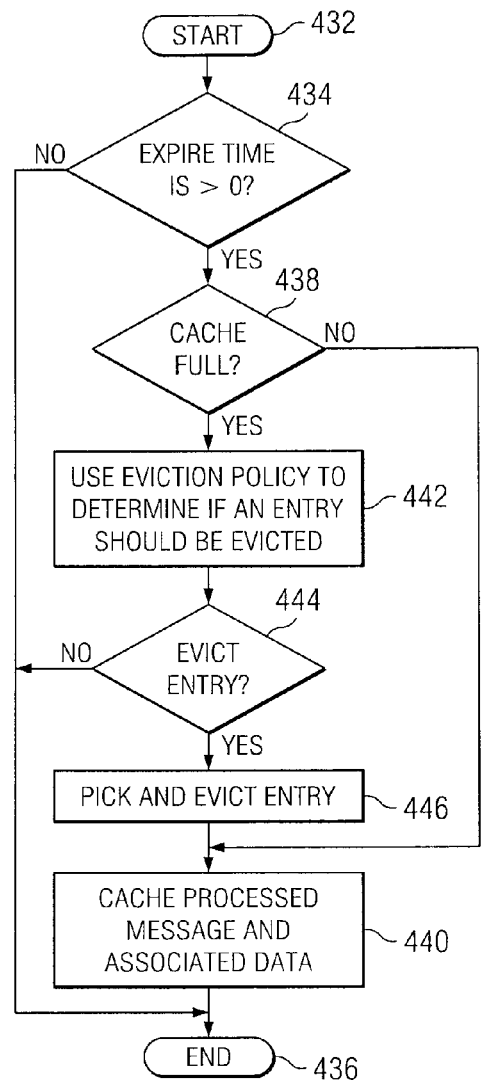
FIG. 4C illustrates an embodiment of a process for adding entries to the cache.

FIG. 4C illustrates an embodiment of a process for adding entries to the cache. The process of FIG. 4C is used in one embodiment to implement 412 of FIG. 4A. In the example shown, the process begins at 432. If the saved expiration time of processed message is not greater than zero at 434, the processed message is not saved, and the process ends at 436. If the expiration time is greater than zero at 434, the cache full determination is performed at 438. If the cache is not full, the processed message and the associated data are stored in the cache at 440, and the process ends at 436. In an embodiment, only a desired portion of the processed message is cached. In an embodiment, the associated data cached with the processed message include a message digest and an expiration time. If the cache is determined to be full at 438, an eviction policy is used to determine if an entry should be evicted. In an embodiment, the cache entry eviction is determined by an entry with the longest expiration time left. By evicting or not caching an entry with the longest expiration time left, a cache entry with a long expiration time cannot dominate the cache. In an embodiment, an entry can be marked in the cache to persist in the cache. In an embodiment, a weight corresponding to chances an entry can be evicted can be set for each entry in the cache. In another embodiment, other eviction policies can be used, including without limitation least recently used, least used, random, and direct mapped. At 444 if an entry is to be evicted from the cache, the entry to be evicted is picked and evicted from the cache at 446. At 440, the processed message and its associated data replace the evicted cache entry, and the process ends at 436. If it is determined no entry should be evicted from the cache at 444, the processed message is not cached, and the process ends at 436.

The process shown in FIGS. 4A, 4B, and 4C and described above may be implemented in any suitable way, such as one or more integrate circuits and/or other device, or as firmware, software, or otherwise.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing an input-dependent output comprising:
   processing, at a processor, a received message to determine if a previously cached output exists for the received message;
   if the previously cached output is found, providing the previously cached output to a destination other than a sender of the received message as output for the received message; and
   processing the received message to produce a newly-generated output if the previously cached output is not found and establishing a cache expiration time for the newly generated output, wherein
   said processing the received message to produce a newly-generated output includes processing the received message using a plurality of processing modules, and said establishing the cache expiration time includes determining, for each processing module of said plurality of processing modules, a module-specific cache expiration time to be associated with the newly generated output based at least in part on the processing performed by a corresponding processing module.

2. A method as recited in claim 1, wherein processing a received message to determine if a previously cached output exists for the received message includes determining if a currently valid previously cached output exists for the received message.

3. A method as recited in claim 2, wherein determining if a currently valid previously cached output exists for the received message includes determining whether an expiration time associated with a previously cached output for the received message has passed.

4. A method as recited in claim 1, further comprising processing the received message to produce a newly-generated output if a previously cached output is not found.

5. A method as recited in claim 4, wherein the newly-generated output is provided as output for the received message.

6. A method as recited in claim 4, wherein the newly-generated output is cached.

7. A method as recited in claim 1, further comprising processing the received message, if a previously cached output is not found, to produce a newly generated output based at least in part on data associated with the received message and caching the newly generated output if a subsequent iteration of said processing performed on said data would produce a subsequent output that is the same as the newly generated output.

8. A method as recited in claim 1, wherein the received message includes data and further comprising processing the received message, if a previously cached output is not found, to produce a newly generated output and caching a portion of the newly generated output, the portion being determined based at least in part on at least a portion of the data, if a subsequent iteration of the processing that generated said portion of the newly generated output would produce a subsequent output in which a corresponding portion of the subsequent output is the same as said portion of the newly generated output.

9. A method as recited in claim 1, further comprising caching the newly-generated output if a non-zero cache expiration time is established for the newly generated output.

10. A method as recited in claim 1, wherein the cache expiration time established for the newly generated output is the shortest of the module-specific cache expiration times for the newly generated output.

11. A method as recited in claim 1, wherein the received message comprises a currently received message and the cached output is based at least in part on processing performed on data included in a previously received message.

12. A method as recited in claim 11, wherein the processing performed on data included in the previously received message includes at least one of: an operation on said data, an analysis of said data, and a transformation of said data.

13. A method as recited in claim 11, wherein the data included in the previously received message is the same as corresponding data included in the currently received message.

14. A method as recited in claim 11, wherein the data included in the previously received message comprises at least in part data from a body or payload portion of the previously received message.

15. A method as recited in claim 11, wherein the data included in the previously received message comprises at least in part application layer data.

16. A method as recited in claim 1, wherein the cache is indexed by a received message identifier.

17. A method as recited in claim 1, wherein each cached output includes a processed message, an associated received message identifier, and an expiration time.

18. A method as recited in claim 1, further comprising evicting an entry from the cache if the cache is full.

19. A method as recited in claim 1, further comprising generating a message identifier of the received message.

20. A system for providing an input-dependent output comprising:
   a processor configured to receive a message, determine if a previously cached output exists for the received message, and provide the previously cached output to a destination other than a sender of the received message as output for the received message if the previously cached output is found, process the received message to produce a newly-generated output if the previously cached output is not found and establish a cache expiration time for the newly generated output, wherein said processing the received message to produce the newly-generated output includes processing the received message using a plurality of processing modules, and said establishing the cache expiration time includes determining, for each processing module of said plurality of processing modules, a module-specific cache expiration time to be associated with the newly generated output based at least in part on the processing performed by a corresponding processing module; and
   a communication interface coupled to the processor and configured to send the previously cached output or the newly-generated output for the received message to the destination other than the sender.

21. A system as recited in claim 20, wherein the processor is configured to determine if a previously cached output exists for the received message including by determining if a currently valid previously cached output exists for the received message.

22. A system as recited in claim 20, wherein the processor is further configured to produce a newly generated output, if a previously cached output is not found, based at least in part on data associated with the received message and cache the newly generated output if a subsequent iteration of said processing performed on said data would produce a subsequent output that is the same as the newly generated output.

23. A system as recited in claim 20, wherein the processor is further configured to cache the newly-generated output if a non-zero cache expiration time is established for the newly generated output.

24. A computer program product for providing an input-dependant output, the computer program product being embodied in a computer readable storage medium and comprising computer instructions for:
  processing a received message to determine if a previously cached output exists for the received message;
  if the previously cached output is found, providing the previously cached output to a destination other than the sender of the received message as output for the received message; and
  processing the received message to produce a newly-generated output if the previously cached output is not found and establishing a cache expiration time for the newly generated output,
wherein said processing the received message to produce a newly-generated output includes processing the received message using a plurality of processing modules, and establishing the cache expiration time includes determining, for each processing module of said plurality of processing modules, a module-specific cache expiration time to be associated with the newly generated output based at least in part on the processing performed by a corresponding processing module.

25. A computer program product as recited in claim 24, wherein processing a received message to determine if a previously cached output exists for the received message includes determining if a currently valid previously cached output exists for the received message.

26. A computer program product as recited in claim 24, further comprising computer instructions for processing the received message, if a previously cached output is not found, to produce a newly generated output based at least in part on data associated with the received message and caching the newly generated output if a subsequent iteration of said processing performed on said data would produce a subsequent output that is the same as the newly generated output.

27. A computer program product as recited in claim 24, further comprising computer instructions for caching the newly-generated output if a non-zero cache expiration time is established for the newly generated output.

* * * * *

UNITED STATES PATENT AND TRADEMARK OFFICE
CERTIFICATE OF CORRECTION

PATENT NO. : 7,574,500 B2 Page 1 of 1
APPLICATION NO. : 11/355193
DATED : August 11, 2009
INVENTOR(S) : Brian Roddy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this

Seventh Day of September, 2010

David J. Kappos
*Director of the United States Patent and Trademark Office*